United States Patent [19]

Stabler

[11] 4,125,514

[45] Nov. 14, 1978

[54] MANUFACTURE OF MOULDING MATERIALS

[75] Inventor: Howard G. Stabler, Irwell Vale, England

[73] Assignee: TBA Industrial Products Limited, Manchester, England

[21] Appl. No.: 839,385

[22] Filed: Oct. 4, 1977

[30] Foreign Application Priority Data

Oct. 4, 1976 [GB] United Kingdom ............... 41136/76

[51] Int. Cl.$^2$ ........................... C08K 5/35; C08K 7/20
[52] U.S. Cl. ............................... 260/42.15; 260/37 N; 260/40 R; 260/42.18; 260/42.43; 260/42.44; 260/42.45; 260/42.46; 260/42.47; 260/857 PA; 260/857 L

[58] Field of Search ................... 260/857 PI, 857 PA, 260/42.18, 42.15, 42.43, 42.44, 42.45, 42.46, 42.47

[56] References Cited

U.S. PATENT DOCUMENTS

| 3,678,015 | 7/1972 | Holub et al. ..................... 260/78 UA |
| 3,717,615 | 2/1973 | Holub et al. ..................... 260/78 UA |

*Primary Examiner*—James H. Derrington
*Attorney, Agent, or Firm*—Cushman, Darby & Cushman

[57] ABSTRACT

A thermoplastic moulding material composed of a polymer selected from polypropylene, polyethylene, polystyrene, styrene/acrylonitrile copolymers, polyesters polyamides, ABS copolymers and acetal copolymers. The material contains glass or mica as reinforcing agent and 0.01% to 0.05% by weight of a polyimide prepolymer.

20 Claims, No Drawings

MANUFACTURE OF MOULDING MATERIALS

This invention concerns improvements in or relating to synthetic thermoplastic moulding materials, and is an improvement in or modification of the invention described and claimed in copending application Ser. No. 708,097 filed July 23, 1976 in the name of Taylor and Lord. Application Ser. No. 708,097 describes and claims a thermoplastic moulding material comprising (a) a synthetic thermoplastic polymer having a backbone comprising at least 50% of carbon atoms selected from polypropylene, polyethylene, polystyrene, styrene/acrylonitrile copolymers, polyesters, polyamides, ABS copolymers and acetal copolymers (b) from 0.05 to 10 percent by weight, based on the total weight of the moulding material; of a polyimide pre-polymer (as hereinafter defined) and (c) a reinforcing agent selected from glass fibre and mica.

We have now found that improved properties are obtainable in the thermoplastic moulding material by the incorporation of even smaller amounts of the polyimide pre-polymer.

Thus, according to the present invention a thermoplastic moulding material comprises (a) a synthetic thermoplastic polymer having a backbone comprising at least 50% of carbon atoms selected from polypropylene, polyethylene, polystyrene styrene/acrylonitrile copolymers, polyesters, polyamides, ABS copolymers and acetal copolymers (b) between 0.01 percent and 0.05 percent by weight, based on the total weight of moulding material, of a polyimide prepolymer (as hereinafter defined) and (c) a reinforcing agent selected from glass fibre and mica.

By polyimide pre-polymer in this specification is meant a prepolymer which is the reaction product of a polyamine and a bis-imide of an unsaturated carboxylic acid and which is capable of reacting further to give a thermoset resin. Polyimides of this type are described in U.K. Pat. Nos. 1,190,718: 1,355,401, 1,355,402; 1,355,403; and are believed to be formed by an addition reaction between the polyamide and the unsaturated bis-Imide rather than by a condensation reaction, the latter being the case with other polyamides.

It is prefered that the polyimide pre-polymer is the reaction product of a primary diamine containing not more than 30 carbon atoms and an N,N¹ bis imide of general formula

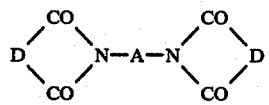

in which D represents a divalent radical containing a carbon-carbon double bond, and A is a divalent radical containing at least two carbon atoms.

Preferably the primary diamine is an aromatic compound, e.g. containing phenylene groups such as the compound of formula

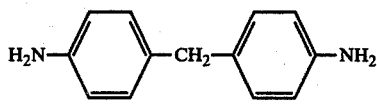

Preferably the N,N¹ bis-imide is derived from an $\alpha\beta$ unsaturated dicarboxylic acid such as maleic acid. The radical A is preferably an aromatic radical such as

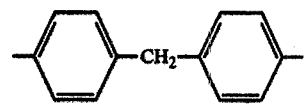

The number average molecular weight of the prepolymer is preferably no more than 5000.

If desired the prepolymer may also contain an additional component derived from either a heat polymerizable unsaturated monomer as described in U.K. Pat. No. 1,355,401 or an unsaturated polyester as described in U.K. Pat. No. 1,355,402.

We have now found that the inclusion of a polyimide prepolymer, even within the range of content specified above, in a thermoplastic polymer incorporating a fibrous reinforcing agent and/or particulate filler, provides a surprising improvement in such mechanical properties as, for example, tensile strength and/or modulus, flexural strength and/or modulus, and/or impact strength.

The thermoplastic polymer preferably is polyethylene, polypropylene, polystyrene, or a styrene-acrylonitrile copolymer, most preferably polypropylene. The preferred reinforcing agent is glass fibre, preferably one dressed with a surface treatment agent, more preferably one dressed with an organosilane. The glass fibre or mica may be mixed with another reinforcing agent, either fibrous or a particulate filler such as talc, and the reinforcing agent may be present in a total amount within the range from 5 to 55 percent by weight of the material.

The thermoplastic moulding material of this invention may be mixed in a compounding extruder, for example by feeding a mixture of thermoplastic polymer and a polyimide prepolymer to the extruder and feeding the glass separately into the extruder, extruding the resulting mix and, for example, pelletizing it for subsequent moulding. The temperatures of the extruder barrel zones may be the usual temperatures for compounding the particular thermoplastic polymer being used.

Alternatively the material of the invention may be mixed in situ, for example at the injection moulding machine itself, by separately feeding the polyimide prepolymer, and a glass/thermoplastic polymer compound to the feed screw of the injection machine.

It is to be noted that when using the expression "moulding material" in relation to the thermoplastic material of this invention we mean a material which is to be melt-processed by any of the usual techniques including not only injection and transfer moulding but also extrusion and the like.

The invention will now be described in more detail by means of the following comparative Examples.

EXAMPLES 1 TO 4

A 28% Glass (Polybutene/Aminosilane Sized Glass)-/Polypropylene (P.P.Powder) composite was prepared on a twin screw compounding extruder by metering polymer powder and feeding glass roving into a vent along the screw. The following percentages (based on total weight of compound) of a proprietory polyimide prepolymer derived from a aromatic diamine and a bis maleimide (commercially available from Rhone Poulenc under the name "Kerimid 601") were incorporated in the melt.

| Example No. | 1 | 2 | 3 | 4 |
|---|---|---|---|---|
| Polyimide Prepolymer | None (blank) | 0.010 | 0.030 | 0.045 |

Test bars were injection moulded from the composites produced (after granulation and drying), and tested.

The following test results were obtained.

| Example No. | 1 (Blank) | 2 | 3 | 4 |
|---|---|---|---|---|
| Property | | | | |
| S.G. | 1.10 | 1.10 | 1.10 | 1.10 |
| Tensile Strength $MN/m^2$ | 52 | 56 | 61 | 64 |
| Elongation at break % | 1.3 | 1.6 | 1.9 | 2.5 |

I claim:

1. A thermoplastic moulding material consisting essentially of:
   (a) from about 35 to about 94.5 percent by weight based on the total weight of material of a synthetic thermoplastic polymer having a backbone comprising at least 50% of carbon atoms selected from the group consisting of polypropylene, polyethylene, polystyrene, styrene/acrylonitrile copolymers, ABS copolymers and mixtures thereof
   (b) between about 0.01 and about 0.045 and percent by weight, based on the total weight of moulding material, of a polyimide prepolymer which is the addition reaction product consisting of a polyamine and a bis-imide of an unsaturated carboxylic acid and
   (c) from about 5 to about 55 percent by weight, based on the total weight of material, of a reinforcing agent selected from the group consisting of glass fiber and mica.

2. A moulding material according to claim 1 in which the polyimide prepolymer consists of the addition reaction product of a primary diamine containing not more than 30 carbon atoms and an $N,N^1$ bis-imide of general formula

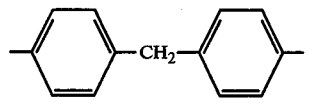

in which D represents a divalent radical containing a carbon-carbon double bond and A is a divalent radical containing at least two carbon atoms.

3. A moulding material according to claim 2 in which the primary diamine is an aromatic compound.

4. A moulding material according to claim 3 in which the primary diamine contains at least one phenylene group.

5. A moulding material according to claim 4 in which the primary diamine is the compound of the formula

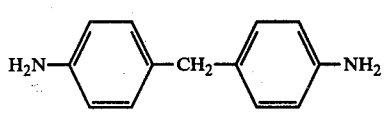

6. A moulding material according to claim 2 in which the radical D in the $N,N^1$ bis-imide is derived from an $\alpha\beta$ unsaturated dicarboxylic acid.

7. A moulding material according to claim 6 in which the radical D is derived from maleic acid.

8. A moulding material according to claim 2 in which the radical A in the $N,N^1$ bis-imide is an aromatic radical.

9. A moulding material according to claim 8 in which the aromatic radical contains at least one phenylene group.

10. A moulding material according to claim 9 in which the radical has the formula

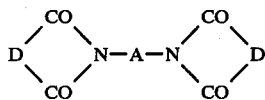

11. A moulding material according to claim 2 in which the molar ratio of bis-imide to polyamine is in the range 1.2:1 up to 50:1.

12. A moulding material according to claim 11 in which the molar ratio of bis-imide to polyamine is in the range 1.2:1 up to 2.9:1.

13. A moulding material according to claim 1 in which the thermoplastic polymer has a backbone composed solely of carbon atoms.

14. A moulding material according to claim 13 in which the thermoplastic polymer is polypropylene.

15. A moulding material according to claim 1 comprising a mixture of thermoplastic polymers.

16. A moulding material according to claim 1 in which the reinforcing agent comprises a mixture of glass fibre or mica with a further fibrous or particulate filler material.

17. A moulding material according to claim 16 in which the reinforcing agent comprises a mixture of glass fibre and talc.

18. A moulding material according to claim 1 in which the reinforcing agent consists solely of glass fibre.

19. A moulding material according to claim 18 in which the reinforcing agent comprises an organosilane dressed glass fibre.

20. A high modulus thermoplastic moulding material consisting essentially in percent by weight based on the total weight of the material of:
   (a) from about 35 to about 94.5 percent of a synthetic thermoplastic polymer having a backbone of at least 50 percent of carbon atoms and selected from the group consisting of polypropylene, polyethylene, polystyrene, copolymers of styrene and acrylonitrile and mixtures thereof;
   (b) from about 0.01 to about 0.045 percent by weight of the addition reaction product consisting of a primary diamine of the formula:

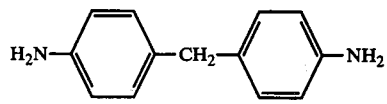

and an N,N' bis-imide of the formula

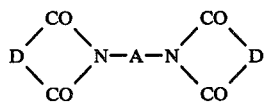
wherein D is a divalent radical containing a carbon-carbon double bond and A is a divalent radical containing at least two carbon atoms; and
(c) from about 5 to about 55 percent of a reinforcing agent selected from the group consisting of glass and mica.
* * * * *